United States Patent [19]
Lien et al.

[11] Patent Number: 5,601,860
[45] Date of Patent: Feb. 11, 1997

[54] CORANDOMIZED FAT COMPOSITIONS FOR INFANT FORMULAS

[75] Inventors: Eric L. Lien, Malvern; Rudolph M. Tomarelli, Phoenixville, both of Pa.

[73] Assignee: American Home Products Corporation, Madison, N.J.

[21] Appl. No.: 242,763

[22] Filed: May 13, 1994

Related U.S. Application Data

[63] Continuation-in-part of Ser. No. 891,539, Jun. 1, 1992, abandoned, which is a continuation of Ser. No. 620,851, Nov. 30, 1990, abandoned.

[51] Int. Cl.⁶ ........................................................ A23L 1/30
[52] U.S. Cl. .......................... 426/72; 426/585; 426/601; 426/607; 426/801
[58] Field of Search ..................... 426/607, 800, 426/72, 801, 73, 601, 648, 580, 585, 417, 656, 658

[56] References Cited

U.S. PATENT DOCUMENTS

| | | | |
|---|---|---|---|
| 2,996,388 | 8/1961 | Lindsay | 426/607 |
| 3,353,964 | 11/1967 | Seiden | 426/607 |
| 3,634,100 | 1/1972 | Fondu et al. | |
| 3,649,295 | 3/1972 | Bernhart | |
| 4,282,265 | 8/1981 | Theuer | 426/607 |
| 4,614,663 | 9/1986 | Rule | 426/601 |
| 4,721,626 | 1/1988 | Rule | 426/601 |
| 5,000,975 | 3/1991 | Tomarelli | 426/602 |

FOREIGN PATENT DOCUMENTS

| | | |
|---|---|---|
| 0488800 | 3/1992 | European Pat. Off. . |
| 2306257 | 10/1976 | France . |
| 1495493 | 12/1977 | United Kingdom . |
| 2142340 | 1/1985 | United Kingdom . |
| 2226569 | 7/1990 | United Kingdom . |
| 2250749 | 6/1992 | United Kingdom . |

OTHER PUBLICATIONS

Majumdar et al., Vanaspati and Margarine Fat Base From Palm Oil and Plam Stearin by Corandomization with Cotton Seed Oil.
Journal of the Oil Technologists' Association of India, (1986) 18(2) 37–38 (abstract only).
FAO Food and Nutrition Paper "Dietary Fats and Oils in Human Nutrition" FAO of U.N.—Rome, 1977.

*Primary Examiner*—Leslie Wong
*Attorney, Agent, or Firm*—Arthur G. Seifert

[57] ABSTRACT

The invention disclosed herein comprises fat compositions primarily for use in nutritionally complete infant formulas in which the constituent palmitic acid oils and lauric acid oils are corandomized. The invention additionally includes such corandomized fat compositions with medium-chain triglycerides added, particularly for use in nutritional products for preterm or low birthweight infants. The invention further includes such fat compositions in which the constituent palmitic acid oils and oleic acid oils are corandomized. Such corandomization of two or more oils yields a mixture of triglycerides having a substantially different chemical makeup than that of the native oils themselves or than the native oils when randomized individually. Corandomization of the palmitic acid oils and the lauric acid oils or of the palmitic acid oils and the oleic acid oils affords an economical means of providing a very highly absorbed fat composition.

52 Claims, No Drawings

CORANDOMIZED FAT COMPOSITIONS FOR INFANT FORMULAS

This application is a continuation-in-part of application U.S. Ser. No. 07/891,539, filed Jun. 1, 1992, now abandoned, which, in turn, is a continuation of application U.S. Ser. No. 07/620,851, filed Nov. 30, 1990, now abandoned.

The invention disclosed herein comprises fat compositions primarily for use in nutritionally complete infant formulas in which the constituent palmitic acid oils and lauric acid oils are corandomized. The invention additionally includes such corandomized fat compositions with medium-chain triglycerides added, particularly for use in nutritional products for preterm or low birthweight infants. Such corandomization of two or more oils yields a mixture of triglycerides having a substantially different chemical makeup than that of the native oils themselves or than the native oils when randomized individually. Corandomization of the palmitic acid and the lauric acid oils and of the palmitic acid and oleic acid oils affords an economical means of providing a very highly absorbed fat composition with a fatty acid profile approaching that of human milk.

BACKGROUND OF THE INVENTION

U.S. Pat. No. 3,542,560, issued on Nov. 24, 1970 to Tomarelli et al., discloses fat compositions for infant formulas having an increased portion of the palmitic acid in the beta (2) position of the triglyceride. This increase is obtained by blending lard, or a synthetic beta-monopalmitin, with the other oils comprising the fat composition, which have a relatively low portion of beta palmitic acid. Such other oils listed are corn, soy bean, palm, peanut, coconut, olive, babassu, cotton seed, oleo, and tallow. However, the use of lard is unacceptable in many areas of the world for religious reasons, and synthetic triglycerides are prohibitively expensive for large scale use. Thus, fat compositions for use in infant formulas are sought which are broadly acceptable on religious dietary grounds, are highly absorbed, have a fatty acid content similar to human milk and are economical to manufacture on very large scales.

Three more recent U.S. patents disclose all vegetable oil fat compositions for use in infant nutritional products with palm oil as the sole palmitic acid oil. These are U.S. Pat. No. 4,282,265, issued on Aug, 4, 1981, to Theuer and U.S. Pat. Nos. 4,614,663 and 4,721,626, issued on Sep. 30, 1986 and Jan. 26, 1988, respectively, to Rule.

Most recently, European patent publication No. 0376628, published on Jul. 4, 1990, to American Home Products Corporation (Tomarelli) discloses all vegetable oil fat compositions in which the palmitic acid oil alone is randomized. This European patent publication also discloses all vegetable oil fat compositions including medium-chain triglycerides for use in infant nutritional products for preterm or low birthweight infants in which the palmitic acid oil alone is randomized.

The present invention differs from that of EP 0376628 in that at least one palmitic acid oil and one lauric acid oil are corandomized, which causes interesterification randomly between the fatty acids of the palmitic acid oil and the lauric acid oil. This corandomization of the two oils resulted in surprisingly superior absorbability to that found when the palm olein oil of the mixture was randomized. Additionally, in the fat compositions of the present invention oleo oil may be used as a palmitic acid oil to be corandomized with a lauric acid oil.

In a further aspect of the present invention, at least one palmitic acid oil and one oleic acid oil are corandomized which provides a fat blend with surprisingly superior absorbability and a close simulation to human breast milk.

DETAILED DESCRIPTION OF THE INVENTION

This invention provides a corandomized fat composition particularly for use in a nutritionally complete infant formula, comprising
  (a) 18–30%, calculated on the weight of the fat composition, of one or more lauric acid oils selected from coconut oil, babassu oil, and palm kernel oil;
  (b) 20–40%, calculated on the weight of the fat composition, of one or more palmitic acid oils selected from oleo oil, palm oil, and palm olein oil;
  (c) 13–34%, calculated on the weight of the fat composition, of one or more oleic acid oils selected from olive oil, safflower oleic oil, sunflower oleic oil, and canola oil; and
  (d) 12–27%, calculated on the weight of the fat composition, of one or more linoleic acid oils selected from corn oil, cottonseed oil, safflower oil, soybean oil, and sunflower oil,
wherein at least the palmitic acid oils and the lauric acid oils are corandomized, the amounts of the oils being such that the fat composition contains, per 100 parts by weight of the total fatty acids present as triglycercides,
  (i) 9–20 parts of lauric acid;
  (ii) 10–25 parts of palmitic acid;
  (iii) 2–10 parts of stearic acid;
  (iv) 25–45 parts of oleic acid; and
  (v) 11–28 parts of linoleic acid.

Preferred corandomized fat compositions of the invention are those wherein only the lauric acid oils and palmitic acid oils are corandomized. Also preferred are those fat compositions wherein only one oil of each type is used, and only one lauric acid oil and one palmitic acid oil are corandomized. The preferred palmitic acid oils are palm olein oil and oleo oil, of which palm olein oil is most preferred. The preferred lauric acid oil is coconut oil The preferred oleic acid oils are safflower oleic oil and sunflower oleic oil, and the preferred linoleic acid oil is soybean oil.

Preferred corandomized fat compositions of the invention comprise
  (a) 20–29%, calculated on the weight of the fat composition, of a lauric acid oil selected from coconut oil, babassu oil, and palm kernel oil;
  (b) 26–38%, calculated on the weight of the fat composition, of a palmitic acid oil selected from oleo oil, palm oil, and palm olein oil;
  (c) 14–30%, calculated on the weight of the fat composition, of an oleic acid oil selected from olive oil, safflower oleic oil, sunflower oleic oil, and canola oil; and
  (d) 14–27%,calculated on the weight of the fat composition, of a linoleic acid oil selected from corn oil, cottonseed oil, safflower oil, soybean oil, and sunflower oil,
wherein the palmitic acid oil and the lauric acid oil are corandomized, the amounts of the oils being such that the fat composition contains, per 100 parts by weight of the total fatty acids present as triglycercides, (i) 10–17 parts of lauric acid;
(ii) 11–22 parts of palmitic acid;
(iii) 3–8 parts of stearic acid;
(iv) 30–43 parts of oleic acid; and
(v) 13–23 parts of linoleic acid.

Especially preferred corandomized fat compositions of the invention are those wherein the oils comprise
 (a) 22–28% coconut oil;
 (b) 30–36% palm olein oil;
 (c) 21–30% safflower oleic oil or sunflower oleic oil; and
 (d) 14–22% soybean oil,
and wherein the fat composition contains, per 100 parts by weight of total fatty acid present as triglycerides,
 (i) 8–14 parts of lauric acid;
 (ii) 15–21 parts of palmitic acid;
 (iii) 3–5 parts of stearic acid;
 (iv) 33–43 parts of oleic acid; and
 (v) 14–21 parts of linoleic acid.

Also especially preferred are corandomized fat compositions of the invention wherein the oils comprise
 (a) 23–29% coconut oil;
 (b) 30–37% oleo oil;
 (c) 14–25% safflower oleic oil or sunflower oleic oil; and
 (d) 18–25% soybean oil,
and particularly wherein the fat composition contains, per 100 parts by weight of total fatty acid present as triglycerides,
 (i) 12–17 parts of lauric acid;
 (ii) 15–21 parts of palmitic acid;
 (iii) 3–5 parts of stearic acid;
 (iv) 30–38 parts of oleic acid; and
 (v) 16–22 parts of linoleic acid.

Further particularly preferred corandomized fat compositions of the invention are those wherein the ratio of the palmitic acid oil to the lauric acid oil is between 65/35 palmitic acid oil/lauric acid oil and 40/60 palmitic acid oil/lauric acid oil. Especially preferred are fat compositions of the invention wherein the ratio of the palmitic acid oil to the lauric acid oil is between 60/40 palmitic acid oil/lauric acid oil and 45/55 palmitic acid oil/lauric acid oil.

In a further advantageous aspect, this invention provides a corandomized fat composition particularly for use in a nutritionally complete infant formula, comprising
 (a) 16–32%, calculated on the weight of the fat composition, of one or more lauric acid oils selected from coconut oil, babassu oil, and palm kernel oil;
 (b) 20–49%, calculated on the weight of the fat composition, of one or more palmitic acid oils selected from palm oil, and palm olein oil;
 (c) 13–37%, calculated on the weight of the fat composition, of one or more oleic acid oils selected from olive oil, safflower oleic oil, sunflower oleic oil, and canola oil; and
 (d) 0–32%, calculated on the weight of the fat composition, of one or more linoleic acid oils selected from corn oil, cottonseed oil, safflower oil, soybean oil, and sunflower oil,
wherein at least the palmitic acid oils and the oleic acid oils are corandomized, the amounts of the oils being such that the fat composition contains, per 100 parts by weight of the total fatty acids present as triglycercides,
 (i) 9–22 parts of lauric acid;
 (ii) 13–22 parts of palmitic acid;
 (iii) 28–43 parts of oleic acid;
 (iv) 10–23 parts of linoleic acid; and
 (v) 1.4–3.7 parts of α-linolenic acid.

Preferred corandomized fat compositions of this aspect of the invention are those wherein only the palmitic acid oils and oleic acid oils are corandomized. Also preferred are those fat compositions wherein only one oil of each type is used, and only one palmitic acid oil and one oleic acid oil are corandomized. The preferred palmitic acid oil is palm olein oil. The preferred oleic acid oil is canola oil. The preferred linoleic acid oils are corn oil and soybean oil, of which soybean oil is particularly preferred. It will be appreciated that the three oleic acid oils, canola, safflower oleic, and sunflower oleic oil, have sufficiently high linoleic acid contents (20 and 15 percent, respectively) that a linoleic acid oil may not be needed to provide the desired nutritional amounts of linoleic acid. Most advantageously, the use of canola oil provides a relatively high level of α-linolenic acid which is converted to docohexaenoic acid (DHA) in the infant body. DHA is present in human milk, but is itself not a consitutent of available vegetable oils. DHA is of crucial importance to retinal function. Advantageous linoleic acid to α-linolenic acid ratios of 11 to 1 to 4 to 1 are obtained from this aspect of the invention.

Preferred corandomized fat compositions of the invention comprise
 (a) 16–27%, calculated on the weight of the fat composition, of a lauric acid oil selected from coconut oil, babassu oil, and palm kernel oil;
 (b) 30–46%, calculated on the weight of the fat composition, of a palmitic acid oil selected from palm oil and palm olein oil;
 (c) 13–34%, calculated on the weight of the fat composition, of an oleic acid oil selected front olive oil, safflower oleic oil, sunflower oleic oil, and canola oil; and
 (d) 7–26%, calculated on the weight of the fat composition, of a linoleic acid oil selected from corn oil, cottonseed oil, safflower oil, soybean oil, and sunflower oil,
wherein the palmitic acid oil and the oleic acid oil are corandomized, the amounts of the oils being such that the fat composition contains, per 100 parts by weight of the total fatty acids present as triglycercides,
 (i) 9–15 parts of lauric acid;
 (ii) 16–22 parts of palmitic acid;
 (iii) 32–42 parts of oleic acid;
 (iv) 10–20 parts of linoleic acid; and
 (v) 2.4–3.7 parts of α-linolenic acid.

Linoleic acid to α-linolenic acid ratios of 9 to 1 to 4 to 1 are preferred.

Especially preferred corandomized fat compositions of the invention are those wherein the oils comprise
 (a) 20–25% coconut oil;
 (b) 39–46% palm oil or palm olein oil;
 (c) 14–29% canola oil; and
 (d) 11–20% corn oil or soybean oil,
wherein the palm olein oil and the canola oil are corandomized, and wherein the fat composition contains, per 100 parts by weight of total fatty acid present as triglycerides,
 (i) 9–14 parts of lauric acid;
 (ii) 18–22 parts of palmitic acid;
 (iii) 33–39 parts of oleic acid;

(iv) 15–19 parts of linoleic acid; and (v) 2.4–3.7 parts of α-linolenic acid.

Linoleic acid to α-linolenic acid ratios of 9 to 1 to 4 to 1 are preferred.

Further particularly preferred corandomized fat compositions of the invention are those wherein the ratio of the palmitic acid oil to the oleic acid oil is between 78/22 palmitic acid oil/oleic acid oil and 50/50 palmitic acid oil/oleic acid oil. Especially preferred are fat compositions of the invention wherein the ratio of the palmitic acid oil to the oleic acid oil is between 75/25 palmitic acid oil/oleic acid oil and 55/45 palmitic acid oil/oleic acid oil. The use of canola oil as the oleic acid oil to be corandomized with the palmitic acid oil is further advantageous because it reduces the lauric acid content of the resulting fat composition to an amount somewhat closer to that of human milk. (Compare Table IIIb with Table IV.)

This invention also provides a corandomized fat composition particularly for use in a nutritionally complete preterm (or low birthweight) infant formula, comprising (a) 8–30%, calculated on the weight of the fat composition, of one or more lauric acid oils selected from coconut oil, babassu oil, and palm kernel oil;

(b) 8–32%, calculated on the weight of the fat composition, of one or more palmitic oils selected from oleo oil, palm oil, or palm olein oil;

(c) 8–30%, calculated on the weight of the fat composition, of one or more oleic acid oils selected from olive oil, safflower oleic oil, sunflower oleic oil, and canola oil;

(d) 10–30%, calculated on the weight of the fat composition, of one or more linoleic acid oils selected from corn oil, cottonseed oil, safflower oil, soybean oil, and sunflower oil; and (e) 10–50%, calculated on the weight of the fat composition, of medium-chain triglycerides (MCT's), wherein at least the palmitic acid oils and the lauric acid oils are corandomized, the amounts of the oils being such that the fat composition contains, per 100 parts by weight of the total fatty acids present as triglycercides, (i) 8–34 parts of caprylic acid;

(ii) 4–16 parts of capric acid;

(iii) 5–22 parts of palmitic acid;

(iv) 18–37 parts of oleic acid; and (v) 7–19 parts of linoleic acid.

Preferred corandomized, preterm fat compositions of the invention are those wherein only the lauric acid oils and palmitic acid oils are corandomized. Also preferred are those preterm fat compositions wherein only one oil of each type is used, and only one lauric acid oil and one palmitic acid oil are corandomized. The preferred palmitic acid oils are palm olein oil and oleo oil, of which palm olein oil is most preferred. The preferred lauric acid oil is coconut oil The preferred oleic acid oils are safflower oleic oil and sunflower oleic oil, and the preferred linoleic acid oil is soybean oil Preferred corandomized, preterm fat compositions of the invention comprise (a) 15–29 %, calculated on the weight of the fat composition, of a lauric acid oil selected from coconut oil, babassu oil, and palm kernel oil;

(b) 15–32 %, calculated on the weight of the fat composition, of a palmitic oil selected from oleo oil, palm oil, or palm olein oil;

(c) 8–30 %, calculated on the weight of the fat composition, of an oleic acid oil selected from olive oil, safflower oleic oil, sunflower oleic oil, and canola oil;

(d) 15–27%, calculated on the weight of the fat composition, of a linoleic acid oil selected from corn oil, cottonseed oil, safflower oil, soybean oil, and sunflower oil: and (e) 10–30%, calculated on the weight of the fat composition, of medium-chain triglycerides (MCT's), wherein the palmitic acid oil and the lauric acid oil are corandomized, the amounts of the oils being such that the fat composition contains, per 100 parts by weight of the total fatty acids present as triglycercides, (i) 8–25 parts of caprylic acid;

(ii) 4–12 parts of capric acid;

(iii) 7–20 parts of palmitic acid;

(iv) 25–38 parts of oleic acid; and (v) 12–20 parts of linoleic acid.

Especially preferred preterm, corandomized fat compositions of the invention are those wherein the oils comprise (a) 22–28% coconut oil;

(b) 20–30% palm olein oil;

(c) 19–30% safflower oleic oil or sunflower oleic oil; and (d) 14–22% soybean oil; and (e) 10–30% MCT's, wherein the coconut oil and the palm olein oil are corandomized, and wherein the fat composition contains, per 100 parts by weight of total fatty acid present as triglycerides, (i) 8–20 parts of caprylic acid;

(ii) 4–8 parts of capric acid;

(iii) 10–17 parts of palmitic acid;

(iv) 26–36 parts of oleic acid; and (v) 12–20parts of linoleic acid.

Also especially preferred are corandomized, preterm fat compositions of the invention wherein the oils comprise (a) 23–29% coconut oil;

(b) 20–30% oleo oil;

(c) 14–25% safflower oleic oil or sunflower oleic oil; and (d) 18–25% soybean oil; and (e) 10–30% MCT's, wherein the coconut oil and the oleo oil are corandomized, and particularly wherein the fat composition contains, per 100 parts by weight of total fatty acid present as triglycerides, (i) 8–25 parts of caprylic acid;

(ii) 4–12parts of capric acid;

(iii) 7–20 parts of palmitic acid;

(iv) 30–38 parts of oleic acid; and (v) 14–20 parts of linoleic acid.

Further particularly preferred corandomized fat compositions of the invention are those wherein the ratio of the palmitic acid oil to the lauric acid oil is between 65/35 palmitic acid oil/lauric acid oil and 40/60 palmitic acid oil/lauric acid oil.

Especially preferred are fat compositions of the invention wherein the ratio of the palmitic acid oil to the lauric acid oil is between 60/40 palmitic acid oil/lauric acid oil and 45/55 palmitic acid oil/lauric acid oil.

In a further advantageous aspect, this invention also provides a corandomized fat composition particularly for use in a nutritionally complete preterm (or low birthweight) infant formula, comprising (a) 8–27%, calculated on the weight of the fat composition, of one or more lauric acid oils selected from coconut oil, babassu oil, and palm kernel oil;

(b) 10–49%, calculated on the weight of the fat composition, of one or more palmitic oils selected from palm oil or palm olein oil;

(c) 8–45%, calculated on the weight of the fat composition, of one or more oleic acid oils selected from olive oil, safflower oleic oil, sunflower oleic oil, and canola oil;

(d) 0–22%, calculated on the weight of the fat composition, of one or more linoleic acid oils selected from corn oil, cottonseed oil, safflower oil, soybean oil, and sunflower oil; and (e) 10–50%, calculated on the weight of the fat composition, of medium-chain triglycerides (MCT's), wherein at least the palmitic acid oils and the oleic acid oils are corandomized, the amounts of the oils being such that the fat composition contains, per 100 parts by weight of the total fatty acids present as triglycercides, (i) 8–34 parts of caprylic acid;

(ii) 4–16 parts of capric acid;

(iii) 5–19 parts of palmitic acid;

(iv) 16–39 parts of oleic acid;

(v) 9–20 parts of linoleic acid; and (vii) 1.4–3.7 parts of α-linolenic acid.

Preferred corandomized, preterm fat compositions of the invention are those wherein only the palmitic acid oils and the oleic acid oils are corandomized. Also preferred are those preterm fat compositions wherein only one oil of each type is used, and only one palmitic acid oil and one oleic acid oil are corandomized. The preferred palmitic acid oil is palm olein oil. The preferred lauric acid oil is coconut oil. The preferred oleic acid oil is canola oil, and the preferred linoleic acid oils are corn oil and soybean oil. As noted above, canola oil, safflower oil and sunflower oleic oil, independently, may provide sufficient levels of linoleic acid such that no linoleic acid oil is needed in some of the subject preterm fat compositions.

Preferred corandomized, preterm fat compositions of the invention comprise (a) 9–27 %, calculated on the weight of the fat composition, of a lauric acid oil selected from coconut oil, babassu oil, and palm kernel oil;

(b) 15–40 %, calculated on the weight of the fat composition, of a palmitic oil selected from palm oil, or palm olein oil;

(c) 12–33 %, calculated on the weight of the fat composition, of an oleic acid oil selected from olive oil, safflower oleic oil, sunflower oleic oil, and canola oil;

(d) 8–22%, calculated on the weight of the fat composition, of a linoleic acid oil selected from corn oil, cottonseed oil, safflower oil, soybean oil, and sunflower oil; and (e) 10–30%, calculated on the weight of the fat composition, of medium-chain triglycerides (MCT's), wherein the palmitic acid oil and the oleic acid oil are corandomized, the amounts of the oils being such that the fat composition contains, per 100 parts by weight of the total fatty acids present as triglycercides, (i) 8–22 parts of caprylic acid;

(ii) 4–10 parts of capric acid;

(iii) 9–19 parts of palmitic acid;

(iv) 23–36 parts of oleic acid;

(v) 13–19 parts of linoleic acid; and (vii) 2.3–3.4 parts of α-linolenic acid.

Especially preferred preterm, corandomized fat compositions of the invention are those wherein the oils comprise (a) 9–27% coconut oil;

(b) 16–32% palm oil or palm olein oil;

(c) 16–33% canola oil;

(d) 9–20% corn oil or soybean oil; and (e) 10–30% MCT's, wherein the palm olein oil and the canola oil are corandomized, and wherein the fat composition contains, per 100 parts by weight of total fatty acid present as triglycerides, (i) 8–21 parts of caprylic acid;

(ii) 4–10 parts of capric acid;

(iii) 10–17 parts of palmitic acid;

(iv) 27–33 parts of oleic acid;

(v) 14–18 parts of linoleic acid; and (vii) 2.3–3.4 parts of α-linolenic acid.

Further particularly preferred corandomized fat compositions of the invention are those wherein the ratio of the palmitic acid oil to the oleic acid oil is between 78/22 palmitic acid oil/oleic acid oil and 25/75 palmitic acid oil/oleic acid oil. Especially preferred are fat compositions of the invention wherein the ratio of the palmitic acid oil to the oleic acid oil is between 65/35 palmitic acid oil/oleic acid oil and 35/65 palmitic acid oil/oleic acid oil.

The corandomized palmitic acid and lauric acid oils and the corandomized palmitic and oleic acid oils of the present invention are mixtures of triglycerides having unique chemical structures. In native fats and oils, the various fatty acids are positioned, i.e. esterified, on one of the three hydroxy groups of the glycerol molecule in an ordered pattern that is characteristic of the particular fat or oil. In general, the long chain saturated fatty acids, C16–C18, are predominantly on the 1 and 3 position, the mono and polyunsaturated fatty acids on the 2 or middle position of the triglyceride molecule. A second distributional characteristic of the fatty acids on the glycerol backbone that exists in nature results in a very large percentage of the triglycerides being so-called mixed triglycerides, i.e. each of the three fatty acids, or at least two, are different. There is only a small amount of simple triglycerides, those in which the three hydroxy groups are esterified with the same fatty acids, e.g. tripalmitin (C16), triolein (C18), etc.

Chemical interesterification, also called randomization (since it alters the nonrandom distribution of nature), is accomplished by heating the fat or oil for a short period of time, usually with a catalyst such as sodium methylate. The fatty acids leave their natural position on the triglyceride and rearrange in a random fashion, i.e., equally on each of the three positions. Thus, one-third of each individual fatty acid is on the one position, one-third on the two, and one-third on the three position of the triglycerides. Randomization of an individual native fatty acid oil also results in an increase in the content of simple triglycerides, or in the case of a palmitic acid oil, of triglycerides consisting only of the long chain saturated fatty acids palmitic and stearic acids. For example, when palm oil or palm olein oil is randomized alone, there is an increase in the amount of palmitic-stearic triglycerides from approximately 3% in the native oils to 11% in the individually randomized oils. Such long chain, completely saturated triglycerides are particularly poorly absorbed.

Corandomization of a lauric acid oil with a palmitic acid oil substantially alters the chemical makeup of the independent native oils because the fatty acids of both oils intermix with one another on the triglyceride. For example, listed below in Table I is the fatty acid makeup of coconut oil (a lauric acid oil) and of palm olein oil (a palmitic acid oil):

TABLE I

Fatty Acid Composition of Coconut Oil and Palm Olein Oil

| Fatty Acid | Percent in Coconut Oil | Percent in Palm Olein oil |
|---|---|---|
| Lauric (C12) | 53.8 | 0.3 |
| Myristic (C14) | 17.5 | 1.0 |
| Palmitic (C16) | 7.3 | 38.5 |
| Stearic (C18) | 2.0 | 4.5 |
| Oleic (C18:1) | 5.6 | 43.7 |
| Linoleic (C18:2) | 0.1 | 10.8 |

From this list it can be seen that palm olein oil has almost no lauric acid or myristic acid. Coconut oil, on the other hand, contains over 50% lauric acid and a fairly high percentage of myristic acid also. Thus, when coconut and palm olien oil are corandomized, there are many resulting triglyceride molecules which have a mixture of palmitic acid and either lauric acid or myristic acid or both—which cannot be the case when palm olein oil is randomized alone.

Thus, the resulting corandomized palm olein and coconut oil is not the same chemical entity as the mixture of nonrandomized palm olein and coconut oils or the mixture of randomized palm olein oil and nonrandomized coconut oil. Native palm olein oil is a collection of triglycerides of defined structures. Corandomized palm olein oil-coconut oil is a collection of triglycerides of entirely different chemical structures. The physical, biochemical and nutritional properties of the three oils/mixtures of oils are different.

The effect of corandomization on the positional distribution of fatty acids of native palm olein and coconut oils is presented in Table II. The alteration in the positional distribution of the fatty acids is indicated by the change in the proportion of the fatty acids in the 2-position. After randomization, theoretically one-third of each fatty acid should be in the 2-position. In practice, however, not all of the fatty acids are randomized equally or completely under the specific randomization conditions employed or at the determined endpoint of the run.

TABLE II

Effect Of Corandomization On The Positional Distribution Of The Fatty Acid

| | Non-randomized 56% PO/44% CoCo* | | Corandomized 56% PO/44% CoCo | |
|---|---|---|---|---|
| Fatty acid** | % FA | % in 2-pos. | % FA | % in 2-pos. |
| C8 | 5.6 | 4.8 | 5.0 | 32.0 |
| C10 | 3.9 | 21.4 | 3.6 | 37.0 |
| C12 | 25.6 | 66.3 | 25.0 | 34.1 |
| C14 | 9.5 | 23.9 | 9.4 | 42.6 |
| C16 | 24.2 | 10.1 | 24.7 | 34.0 |
| C18 | 3.2 | 12.5 | 3.3 | 37.4 |
| C18:1 | 22.2 | 35.1 | 23.1 | 28.1 |
| C18:2 | 5.8 | 40.8 | 5.9 | 28.8 |

*CoCo = coconut oil and PO = palm olein oil
**See table IV for the names of the fatty acids The effect of corandomization on the positional distribution of fatty acids of native palm olein and canola oils is presented in Table IIa.

TABLE IIa

Effect Of Corandomization On The Positional Distribution Of The Fatty Acids

| | Non-randomized 65% PO/35% Can* | | Corandomized 65% PO/35% Can* | |
|---|---|---|---|---|
| Fatty acid** | % FA | % in 2-pos. | % FA | % in 2-pos. |
| C12 | 0.2 | — | 0.2 | 33 |
| C14 | 0.7 | 7 | 0.7 | 34 |
| C16 | 27.5 | 6 | 27.8 | 33 |
| C18 | 3.5 | 44 | 3.6 | 32 |
| C18:1 | 46.5 | 8 | 46.1 | 33 |
| C18:2 | 14.1 | 49 | 13.8 | 33 |

*PO = palm olein oil and Can = canola oil

Corandomized palm olein and coconut oil also differs importantly in its biochemical properties from a mixture of native palm olein and coconut oils. This difference is particularly significant for use in infant nutritional products. In the digestion of triglycerides in the intestine, pancreatic lipase hydrolyzes the fatty acids at the 1 and 3 position, resulting in two free fatty acids and a 2-monoglyceride containing the fatty acid of the glyceride 2 position. A long chain saturated fatty acid is less well absorbed as a free fatty acid than if it is present in the gut as a 2-monoglyceride.

Palmitic acid is the major saturated faty acid of human milk triglycerides. It is a long chain, C16, fatty acid. Long chain fatty acids are not as well absorbed as short chain or unsaturated fatty acids, yet the palmitic acid of human milk is well absorbed because the palmitic acid of human milk is predominantly in the 2-position, and, after intestinal digestion, the majority of the palmitic acid is present in the intestine as the more readily absorbed 2-monopalmitin.

As seen in Tables II and IIa above, corandomized palm olein oil/coconut oil and corandomized palm olein oil/canmola oil have triple the amount of palmitic acid in the 2 position of the triglyceride as do the respective mixture of native palm olein oil and native coconut oil or native canola oil. Accordingly, the nutritional value of the corandomized fat compositions of the invention is significantly improved with respect to prior all vegetable oil fat compositions which use only the native palmitic acid oils.

Corandomization may be accomplished by heating from 0.5 to 4 hours, preferably 0.5 to 2 hours, at temperatures from 100°–140° C., preferably 110°–130° C., with 0.05–0.50 percent, preferably 0.05–0.15 percent, of sodium methylate present. The end point of the corandomization process should provide palmitic acid at least 27%, and preferably 33%, in the 2 position of the triglycerides.

The present invention also provides a nutritionally complete food product adapted for human infant nutrition containing the fat compositions according to the invention, as fully described above. Such food product comprises the fat composition, a protein source, a carbohydrate source, and appropriate levels of vitamins, minerals and other nutritional factors. The product may be a ready-to-feed liquid, or in the form of a powder or concentrated liquid adapted to provide a ready-to-feed form by the addition of water and stirring. The product preferably contains 2.2 to 4.0 g, advantageously about 3.6 g of a fat composition of the invention; 1.2 to 3.0 g, advantageously about 1.5 g of protein; and 6 to 9 g of carbohydrate—per 100 ml of the ready-to-feed liquid formula supplying preferably 60–75 kcal per 100 ml.

As protein sources there may be mentioned casein, salts of casein (e.g. potassium caseinate), whey protein concentrate, soybean protein isolate, cow's milk protein, or hydrolyzed whey, casein or soy protein. Cow's milk protein differs from that of human milk in the proportions present as casein and whey protein. Cow's milk has about 80% casein and 20% whey proteins, whereas human milk has about 40% casein and about 60% whey proteins. Accordingly, the protein used may be adapted to simulate that of human milk by supplementing cow's milk protein with an appropriate amount of whey protein. Because whey contains a very high proportion of the minerals of milk, the whey is subjected to demineralisation, in particular by electrodialysis or ultrafiltration, to prepare whey protein. When a milk-free diet for infants who are intolerant of cow's milk protein is desired, the protein source may be isolated soy protein or hydrolyzed casein or whey protein. The proteins may be used in combination.

As a carbohydrate source lactose is generally preferred in formulas for normal, healthy infants. However, lactose would be contraindicated for infants suffering from galactosemia, lactose intolerance, or cow's milk protein intolerance. (In the latter case, the lactose may contain traces of cow's milk protein.) Where a milk-free diet is desired, the carbohydrate source may be sucrose, corn syrup solids (glucose polymers), or a combination of corn syrup solids with sucrose. The carbohydrates may also be used in combination.

Additionally, the food product (infant formula) would contain nutritionally acceptable quantities of the following minerals and vitamins: calcium, phosphorus, potassium, sodium, chloride, magnesium, iron, copper, zinc, manganese, iodine and selenium; and vitamin A, vitamin D, vitamin E, vitamin $K_1$, vitamin $B_1$, vitamin $B_2$, vitamin $B_6$, vitamin $B_{12}$, vitamin C, pantothenic acid, niacin, folic acid, biotin, choline and inositol. The food product could contain other nutritional factors, such as taurine, carnitine, nucleotides, and a source of long chain polyunsaturated fatty acids.

The present invention also provides a nutritionally complete food product adapted for the feeding of proterm or low birthweight infants, said product containing a fat composition according to the invention as fully described above. The product may be a ready-to-feed liquid or a powder or a concentrated liquid adapted to provide the ready-to-feed form by the addition of water and stirring. The product preferably contains, per 100 ml of ready-to-feed formula, 1.5–2.5 g of protein, preferrably 2.0–2.2 g of whey predominant protein; 2.2–6.0 g of fat, preferrably 3.5–4.4 g of the preferred corandomized fat blend of the present invention; and 4.7–11.0 g of carbohydrate, preferably 7.0–8.6 g consisting of approximately equal parts of lactose and glucose polymers, said amounts supplying preferably 65–85 kcal/100 ml. Additionally, the proterm food product contains the vitamins, minerals and other nutritional factors described above for the term formula, but in amounts suitable for the preterm or low birthweight infant.

The invention includes a process for the preparation of the fat composition by blending the components (a), (b), (c), and (d) [and (e) for the preterm fat composition] together in such proportions that the resultant composition has the required composition of fatty acids. Additionally, an emulsifying agent such as lecithin or diglycerides, in an amount up to 2 percent of the total weight of the fat composition, may be blended into the fat mixture. Soy bean lecithin concentrate is commonly used, and since the concentrate contains essentially the same amount of fatty acids as in soybean oil, in the examples of fat blends presented below, 1 percent of soybean lecithin concentrate is included in the listed amounts of soybean oil. The proportions of the oils to be used can be calculated from the fatty acid profiles of the individual oil components. The blending is preferably performed at a blending temperature above the melting point of the fat mixture, whereby each component oil is in the liquid phase. The heating of the oils to the blending temperature and the mixing of the oils in a conventional mixing apparatus should be carried out with careful temperature control. A blending temperature within the range of about 36° C. to 50° C. may be used. Oil soluble vitamins are normally dissolved in the fat composition as a preliminary step.

To prepare the nutritionally complete food product, the completed fat mixture is mixed with the other components which have been separately combined. The combination is then emulsified. Processing to a final ready-to-feed liquid, concentrated liquid or powder may be carried out in a conventional manner.

The practice of the invention is further represented by the following examples:

EXAMPLE 1

Table III presents eight fat blends of the invention, utilizing only the four preferred fat ingredients: Blends A and B represent preferred fat blends utilizing palm olein oil. Blends C and D represent preferred fat blends utilizing oleo oil. In Table III, the fatty acid totals do not add up to 100% because only the major fatty acids are included. The fatty acid percentage values used elsewhere in the description of the fat compositions of the invention are arrived at in a similar manner. The ratios of lauric acid oil to palmitic acid oil of fat blends A to H of Table IH are shown in Table IIIa.

TABLE III

| Corandomized Fat Blends With Preferred Oils And Their Fatty Acid Compositions | | | | | | | | |
|---|---|---|---|---|---|---|---|---|
| | | | | | Palm Olein | | Oleo | |
| | Palm Olein | | Oleo | | Low | Hi | Low | Hi |
| | A | B | C | D | E | F | G | H |
| Oils | | | | | | | | |
| Coconut | 25* | 27* | 27* | 25* | 28* | 20* | 28* | 26* |
| Palm olein | 32* | 35* | — | — | 26* | 38* | — | — |
| Oleo | — | — | 35 | 32 | — | — | 26 | 38 |
| Safflower oleic | 28 | 15 | 15 | 28 | 29 | 27 | 25 | 15 |
| Soybean fatty acids** | 15 | 23 | 23 | 15 | 17 | 15 | 21 | 21 |
| C8 | 1.7 | 1.9 | 1.9 | 1.7 | 1.9 | 1.4 | 1.9 | 1.8 |
| C10 | 1.3 | 1.4 | 1.4 | 1.3 | 1.4 | 1.0 | 1.4 | 1.3 |
| C12 | 13.6 | 14.7 | 14.6 | 13.5 | 15.2 | 11.0 | 15.1 | 14.0 |
| C14 | 4.8 | 5.1 | 5.8 | 5.4 | 5.2 | 3.9 | 5.7 | 5.7 |
| C16 | 17.0 | 18.2 | 13.4 | 12.5 | 15.1 | 18.9 | 11.6 | 13.9 |
| C18 | 3.0 | 3.2 | 7.3 | 6.8 | 2.9 | 3.2 | 6.0 | 7.1 |
| C16:1 | 0.1 | 0.1 | 1.0 | 0.9 | 0.1 | 0.1 | 0.8 | 1.1 |
| C18:1 | 40.6 | 34.1 | 35.0 | 41.5 | 39.4 | 42.2 | 38.1 | 35.9 |
| C18:2 | 16.0 | 18.8 | 15.9 | 13.3 | 16.6 | 16.5 | 16.0 | 14.8 |
| C18:3 | 0.9 | 1.4 | 1.5 | 1.0 | 1.0 | 0.9 | 1.4 | 1.4 |

*Oils corandomized
**See Table IV for the names of the fatty acids

TABLE IIIa

Ratio Of Palmitic Acid Oil To Lauric Acid Oil

| Blend | Percent Total Palmitic and Lauric | Palmitic/ Lauric |
|---|---|---|
| A | 57 | 56.0/44.0 |
| B | 62 | 56.4/43.6 |
| C | 62 | 56.4/43.6 |
| D | 57 | 56.1/43.9 |
| E | 54 | 48.0/52.0 |
| F | 58 | 65.5/34.5 |
| G | 54 | 48.2/51.8 |
| H | 64 | 59.0/41.0 |

Table IIIb below shows the fatty acid compostion of three preferred fat blends in which the palmitic acid oil and the oleic acid oil are corandomized.

TABLE IIIb

Preferred Palm Olein/Canola Oil Fat Blends And Their Fatty Acid Compositions

|  | PO/C 63/37 | PO/C 63/37 | PO/C 75/25 |
|---|---|---|---|
| Oils | | | |
| Coconut | 22.0 | 22.0 | 22.0 |
| Palm olein | 41.0* | 41.0* | 45.0* |
| Canola | 24.0* | 24.0* | 15.0* |
| Corn | 13.0 | — | — |
| Soybean | — | 13.0 | 18.0 |
| fatty acids∗∗ | | | |
| C8 | 1.5 | 1.5 | 1.5 |
| C10 | 1.1 | 1.1 | 1.1 |
| C12 | 12.0 | 12.0 | 12.0 |
| C14 | 4.3 | 4.3 | 4.3 |
| C16 | 19.5 | 19.4 | 21.1 |
| C18 | 3.0 | 3.2 | 3.4 |
| C16:1 | 0.2 | 0.2 | 0.2 |
| C18:1 | 37.5 | 37.1 | 34.6 |
| C18:2 | 16.9 | 16.5 | 17.9 |
| C18:3 | 2.4 | 3.0 | 2.5 |

*Oils corandomized

Table IV belowshows the ranges of the fatty acid composition of human milk. These ranges were taken from 11 published reports from the U.S., Great Britain, Canada, West Germany, Australia and Finland from 1965–1983. Further variances from these ranges will be found in other geographic areas, for example, where the diet is largely vegetarian or where fish or other seafoods are a major food source. The fat compositions of the invention have a fatty acid pattern reasonably similar to that of human milk.

TABLE IV

Human Milk Fatty Acid Ranges

| Fatty Acid | | Ranges Reported |
|---|---|---|
| C8 | Caprylic | 0.1 |
| C10 | Capric | 0.8–1.6 |
| C12 | Lauric | 3.1–6.3 |
| C14 | Myristic | 5.1–7.4 |
| C16 | Palmitic | 20.2–25.2 |
| C18 | Stearic | 5.5–10.4 |
| C16:1 | Palmitoleic | 3.7–4.1 |
| C18:1 | Oleic | 29.4–46.9 |
| C18:2 | Linoleic | 7.2–15.6 |
| C18:3 | Linolenic | 0.7–2.0 |

EXAMPLE 2

Table V below gives seven further examples (I–O) of corandomized fat blends of the invention. These examples utilize the different oils in each group in the preferred amount for that particular group. Here, and in other tables herein, the fatty acids are listed by the number of carbon atoms in the chain, also noting positions of unsaturation, according to the conventional practice. Reference may be made to Table IV above, "Human Milk Fatty Acid Ranges", for correlation of the name of the fatty acid with conventional numerical designation.

TABLE V

Preferred Corandomized Fat Blends With Other Oils Within The Class

|  | A** | I | J | K | L | M | N | O |
|---|---|---|---|---|---|---|---|---|
| Lauric acid oils | | | | | | | | |
| coconut | 25* | 25* |  | 25* |  |  |  |  |
| babassu |  |  | 25* |  | 25* | 25* |  |  |
| palm kernel |  |  |  |  |  |  | 25* | 25* |
| Palmitic acid oils | | | | | | | | |
| palm olein | 32* | 32* |  | 32* |  | 32* |  |  |
| palm oleo |  |  | 32* |  | 32* |  | 32* | 32* |
| Oleic acid oils | | | | | | | | |
| safflower oleic | 28 | 28 |  |  |  | 28 |  |  |
| canola |  |  |  | 28 | 28 |  |  | 28 |
| sunflower oleic |  |  | 28 |  |  |  | 28 |  |
| Linoleic acid oils | | | | | | | | |
| soy | 15 |  | 15 |  |  | 15 |  |  |
| safflower |  |  |  | 15 | 15 |  |  |  |
| corn |  | 15 |  |  |  |  | 15 | 15 |
| Fatty acids∗∗∗ | | | | | | | | |
| C12 | 13.6 | 13.5 | 11.4 | 13.5 | 11.3 | 11.3 | 12.9 | 12.7 |
| C14 | 4.8 | 5.3 | 4.8 | 4.8 | 4.8 | 5.3 | 5.0 | 5.6 |
| C16 | 17.0 | 12.0 | 17.0 | 18.1 | 18.1 | 12.0 | 17.3 | 13.0 |
| C18 | 3.0 | 6.9 | 3.5 | 3.3 | 3.8 | 7.4 | 3.0 | 6.5 |
| C18:1 | 40.6 | 43.6 | 42.7 | 32.5 | 34.6 | 45.7 | 42.8 | 38.9 |
| C18:2 | 16.0 | 12.0 | 16.0 | 21.7 | 21.7 | 12.0 | 16.3 | 16.7 |
| C18:3 | 0.9 | 0.3 | 0.9 | 2.3 | 2.3 | 0.3 | 0.9 | 2.5 |

*oils corandomized
**also in Table III
***See Table IV for the names of the fatty acids

EXAMPLE 3

Tables VI and VII below demonstrate the significant reductions in excretion of fat obtained with the corandomized fat blends of the invention. Table VI shows the reduction in excretion of the total fatty acids and of the palmitic acid itself from a diet containing corandomized coconut-palm olein oil compared to one containing the same ratio of nonrandomized coconut and palm olein oils. Table VII shows the reduction in excretion of palmitic acid from a diet containing corandomized coconut-palm olein oil compared to one containing the same ratio of a mixture of randomized palm olein oil and native coconut oil. The excretion data given below was obtained on young male rats according to the method described in U.S. Pat. No. 3,542,560, issued on Nov. 24, 1970, to Tomarelli et al., under "Part II" of the Example, at column 4, lines 34–73. Despite the fact that the rat absorbs fats very effeciently, marked differences in the fecal excretion of fat due to corandomization are readily demonstrated.

TABLE VI

Fat Excretion Of Mixtures Of Native Coconut And Palm Olein Oils Versus That Of Corandomized Coconut-Palm Olein Oil

| Ratio CoCo/PO | Corand. Oils | Native Oil | Corand. Oils | Native Oil |
|---|---|---|---|---|
| | Total Fatty Acids | | Palmitic Acid | |
| 53/47 | 3.5 ± 1.3 | 1.3 ± 0.2 | 9.7 ± 0.7 | 3.2 ± 0.6 |
| 44/56 | 5.0 ± 0.3 | 2.1 ± 0.3 | 13.2 ± 0.7 | 5.3 ± 0.7 |
| 35/65 | 7.4 ± 0.6 | 2.1 ± 0.3 | 16.6 ± 1.3 | 4.5 ± 0.6 |
| 25/75 | 7.4 ± 0.7 | 4.2 ± 0.3 | 16.1 ± 1.5 | 8.6 ± 0.7 | all differences are statistically significant

Table VIa shows the reduction in excretion of the total fatty acids and of the palmitic acid itself from a diet containing corandomized palm olein-canola oil compared to one containing the same ratio of nonrandomized palm olein and canola oils.

TABLE VIa

Fat Excretion Of Mixtures Of Native Palm Olein and Canola Oils Versus That Of Corandomized Palm Olein-Canola Oil

| Ratio PO/Can | Corand. Oils | Native Oil | Corand. Oils | Native Oil |
|---|---|---|---|---|
| | Total Fatty Acids | | Palmitic Acid | |
| 75/25 | 10.3 ± 0.55 | 2.66 ± 0.15 | 22.9 ± 1.29 | 5.48 ± 0.26 |
| 65/35 | 5.50 ± 0.32 | 1.74 ± 0.27 | 14.3 ± 0.70 | 3.58 ± 0.58 |
| 55/45 | 4.28 ± 0.25 | 1.62 ± 0.10 | 11.1 ± 0.62 | 3.34 ± 0.22 | all differences are statistically significant

TABLE VII

Excretion Of Palmitic Acid From Corandomized Coconut-Palm Olein Oil Versus That For Coconut Oil Plus Randomized Palm Olein Oil

| Ratio Coco/PO | Coco + Rand. PO | Corand. Coco-PO |
|---|---|---|
| | Percent Excretion | |
| 53/47 | 11.5 ± 1.4 | 3.2 ± 0.6 |
| 44/56 | 10.0 ± 0.8 | 5.3 ± 0.7 |
| 35/65 | 7.8 ± 1.2 | 4.5 ± 0.6 |
| 25/75 | 10.3 ± 0.7 | 8.6 ± 0.7 | all differences are statistically significant

The data in Table VI demonstrates the surprising reductions in excretion of both total fatty acids and of palmitic acid found with the corandomized lauric acid-palmitic acid oil of the invention when compared to the same mixture of the native (nonrandomized) oils. These significant reductions in excretion are only partly explained by the increased amount of palmitic acid in the 2-position in the corandomized oil. These data also show the particularly signifcant reductions in excretion of both total fatty acid and of palmitic acid when the ratio of coconut oil/palm olein oil corandomized is 35/65 to 53/47. Again, these improvements due to the invention can only be partly explained by the increased amount of the palmitic acid in the 2-position of the corandomized oil.

The data in Table VII demonstrates a further surprising result with respect to the corandomized oils of the invention. This data demonstrates significant decreases in excretion of palmitic acid of a corandomized lauric acid-palmitic acid oil of the invention when compared to a similar mixture of native lauric acid oil and randomized palmitic acid oil. These results are indeed unexpected since the amount of palmitic acid in the 2-position is approximately 33% in both the corandomized oil and the mixed nonrandomized-randomized oils.

A possible explanation for these unexpected results lies in the change in the profile of the long chain saturated triglycerides of the corandomized oil compared to that of the mixture of one native and one randomized oil (ie. the palmitic acid oil). The amount of palmitic-stearic triglycerides in the corandomized mixtures may be calculated and is shown in Table VIII below.

TABLE VIII

Percentages Of Long Chain Saturated Triglycerides Relative To The Proportions Of Coconut Oil And Palm Olein Oil That Are Corandomized

| Coconut/palm olein ratio | % triglycerides containing only palmitic and stearic acids |
|---|---|
| 53/47 | 1.4 |
| 44/36 | 2.2 |
| 35/65 | 3.2 |
| 25/75 | 4.4 |
| 0/100 | 11.0 |

From these calculations it can be seen that, as the proportion of coconut oil is descreased in the corandomized mixtures, the percentage of palmitic-stearic acid triglycerides increases from 1.4% to the 11% that results when the palm olein oil is randomized separately. Thus, the expecially favorable absorption (ie. reduced excretion) acheived with corandomization may be explained not only in the proportion of palmitic acid in the 2-position, but also, and apparently much more significantly, because of the reduced amount of the long chain saturated triglycerides of palmitic and stearic acids, which are poorly digested and absorbed.

EXAMPLE 4

Table IX below shows seven corandomized fat blends of the invention particularly for use in formulas for preterm or low birthweight infants. These fat blends use the preferred lauric and palmitic acid oils for corandomization.

TABLE IX

Fat Blends For Preterm Infants

| | S | T | U | V | W | X** | Y |
|---|---|---|---|---|---|---|---|
| Fat ingredient | | | | | | | |
| Coconut oil | 30 | 21 | 12 | 28 | 25 | 27 | 20 |
| Palm Olein oil | 10 | 30 | 10 | 24 | 20 | 20 | 15 |
| Safflower Oleic oil | 25 | 21 | 15 | 8 | 20 | 25 | 20 |
| Soybean oil | 25 | 18 | 13 | 10 | 15 | 18 | 15 |
| MCT | 10 | 10 | 50 | 50 | 20 | 10 | 30 |
| Fatty acids* | | | | | | | |
| C8 | 8.7 | 8.1 | 33.7 | 33.5 | 14.9 | 8.5 | 21.1 |
| C10 | 4.6 | 4.2 | 3.8 | 6.9 | 7.4 | 3.0 | 6.5 |
| C12 | 16.6 | 12.1 | 7.4 | 5.5 | 14.2 | 15.1 | 11.6 |
| C14 | 5.5 | 4.2 | 2.3 | 1.8 | 4.8 | 5.1 | 3.8 |
| C16 | 9.6 | 15.8 | 6.7 | 11.1 | 11.9 | 12.6 | 9.6 |
| C18 | 2.4 | 2.8 | 1.4 | 1.7 | 2.3 | 2.5 | 2.0 |
| C18:1 | 31.3 | 34.3 | 19.6 | 19.1 | 23.8 | 33.5 | 26.5 |
| C18:2 | 18.7 | 16.1 | 10.5 | 9.1 | 13.3 | 15.7 | 12.8 |
| C18:3 | 1.5 | 1.1 | 0.8 | 0.6 | 0.9 | 1.1 | 0.9 |

*MCT—medium chain triglycerides
**Preferred
***See Table IV for the names of the fatty acids Table X shows fat blends for preterm infants in which oleo oil is the palmitic acid oil corandomized with coconut oil.

TABLE X

Fat Blends For Preterm Infants Containing Corandomized Oleo And Coconut Oil

| | AA | AB | AC | AD | AE | AF | AG |
|---|---|---|---|---|---|---|---|
| Fat ingredient | | | | | | | |
| Coconut oil | 27 | 30 | 20 | 12 | 21 | 8 | 25 |
| Oleo oil | 20 | 10 | 15 | 10 | 30 | 24 | 20 |
| Safflower oleic oil | 25 | 25 | 20 | 15 | 21 | 8 | 20 |
| Soybean oil | 18 | 25 | 15 | 13 | 18 | 10 | 15 |
| MCT | 10 | 10 | 30 | 50 | 10 | 50 | 20 |
| Fatty acids* | | | | | | | |
| C8 | 8.5 | 8.7 | 21.1 | 33.7 | 8.0 | 33.4 | 14.9 |
| C10 | 4.4 | 4.6 | 10.2 | 16.0 | 4.1 | 15.8 | 7.4 |
| C12 | 14.8 | 16.4 | 11.3 | 7.3 | 11.5 | 5.1 | 13.8 |
| C14 | 5.4 | 5.6 | 4.0 | 2.4 | 4.6 | 2.1 | 5.0 |
| C16 | 9.8 | 8.2 | 7.5 | 5.3 | 11.6 | 7.8 | 9.1 |
| C18 | 4.9 | 3.6 | 3.7 | 2.6 | 6.3 | 4.6 | 4.7 |
| C16:1 | 0.6 | 0.3 | 0.5 | 0.3 | 0.9 | 0.7 | 0.6 |
| C18:1 | 34.5 | 31.7 | 27.2 | 20.1 | 35.7 | 20.2 | 29.8 |
| C18:2 | 14.2 | 17.9 | 11.7 | 9.7 | 13.9 | 7.3 | 11.8 |
| C18:3 | 1.2 | 1.5 | 1.0 | 0.8 | 1.2 | 0.7 | 1.0 |

*See Table IV for the names of the fatty acids

EXAMPLE 5

Given below are two examples of the composition of a complete infant nutritional food product using a corandomized fat composition of the invention. In the examples, the preferred fat composition is used, but any corandomized palmitic acid oil-lauric acid oil fat blend of the invention may be used. "PO" below stands for palm olein oil, and "S-Oleic" stands for safflower oleic oil.)

Example 5 - Term Formulas

| | 1A | 1B | 1C |
|---|---|---|---|
| Protein | non-fat milk and demineralized whey | soy protein isolate\ | nonfat milk + deminerized whey |
| Fat (oils) | PO-25% | PO-25% | PO-45% |
| | Coconut-32% | Coco.-32% | Coco.-22% |
| | S.-Oleic-28% | SfOleic-28% | Can.-15% |
| | Soy-15% | Soy-15% | Soy-18 |
| Carbohydrate | lactose | sucrose | lactose |

| Constituents | per liter | per liter | per liter |
|---|---|---|---|
| Energy kcal | 676 | 676 | all |
| Protein g | 15 | 21 | as for 1A |
| Fat g | 36 | 36 | |
| Carbohydrate g | 72 | 69 | |
| Water g | 904 | 898 | |
| Linoleic Acid mg | 3300 | 3300 | |
| Vitamin A IU | 2000 | 2000 | |
| Vitamin D IU | 400 | 400 | |
| Vitamin E IU | 9.5 | 9.5 | |
| Vitamin K mcg | 55 | 100 | |
| Thiamin (Vit B1) mcg | 670 | 670 | |
| Riboflavin (Vit B2) mcg | 1000 | 1000 | |
| Vitamin B6 mcg | 420 | 420 | |
| Vitamin B12 mcg | 1.3 | 2 | |
| Niacin mcg | 5000 | 5000 | |
| Folic Acid (Folacin) mcg | 50 | 50 | |
| Pantothenic Acid mcg | 2100 | 2100 | |
| Biotin mcg | 15 | 35 | |
| Vit C (Ascorbic Acid) mg | 55 | 55 | |
| Choline mg | 100 | 85 | |
| Inositol mg | 32 | 27 | |
| Taurine mg | 40 | 40 | |
| Carnitine mg | 37 | 8.5 | |
| Nucleotide monophosphates mg | 29.5 | — | |
| Calcium mg | 420 | 600 | |
| Phosphorus mg | 280 | 280 | |
| Magnesium mg | 45 | 67 | |
| Iron mg (w/wo) | 12.0/1.5 | 11.5 | |
| Zinc mg | 5 | 5 | |
| Manganese mcg | 150 | 150 | |
| Copper mg | 470 | 470 | |
| Iodine mcg | 60 | 60 | |
| Sodium mg | 150 | 200 | |
| Potassium mg | 560 | 700 | |
| Chloride mg | 375 | 375 | |

EXAMPLE 6

Given below are two examples of the composition of a complete preterm infant nutritional food product using a corandomized preterm fat composition according to the invention. In the examples, the preferred preterm fat composition is used, but any corandomized palmitic acid oil /lauric acid oil fat composition of the invention may be used. "PO" below stands for palm olein oil, and "MCT" stands for medium-chain triglycerides.)

| | 2A | 2B | 2C |
|---|---|---|---|
| Protein mlk | non-fat milk and demineralized whey | non-fat milk and demineralized whey | Nonfat + demineralized whey |
| Fat (oils) | MCT-10% | MCT-10% | MCT-10% |
| | PO-20% | Oleo-25% | PO-30% |
| | Coco.-27% | Coco.-27% | Coco.-27 |
| | SafOleic-25% | SafOleic-15% | Can.-18% |
| | Soy-18% | Soy-23% | Soy-15% |
| Carbo- | lactose and | lactose and | lactose + |

-continued

| hydrate | glucose polymers | glucose polymers | glucose polymers |
|---|---|---|---|
| Constituents | per liter | per liter | per liter |
| Energy kcal | 810 | 810 | all as for 2A |
| Protein g | 20 | 22.0 | |
| Fat g | 44 | 42.1 | |
| Carbohydrate g | 86 | 86.5 | |
| Water g | 880 | 882 | |
| Linoleic Acid mg | 4000 | 4050 | |
| Vitamin A IU | 2400 | 8100 | |
| Vitamin D IU | 480 | 2430 | |
| Vitamin E IU | 15 | 36.5 | |
| Vitamin K mcg | 70 | 105 | |
| Thiamin (Vit B1) mcg | 800 | 2025 | |
| Riboflavin (Vit B2) mcg | 1300 | 2835 | |
| Vitamin B6 mcg | 500 | 2025 | |
| Vitamin B12 mcg | 2 | 3.2 | |
| Niacin mcg | 6300 | 36450 | |
| Folic Acid (Folacin) mcg | 100 | 284 | |
| Pantothenic Acid mcg | 3600 | 12150 | |
| Biotin mcg | 18 | 16.2 | |
| Vit C (Ascorbic Acid) mg | 70 | 284 | |
| Choline mg | 127 | 64.8 | |
| Inositol mg | 32 | 200 | |
| Taurine mg | 48 | 48 | |
| Carnitine mg | 49 | 59 | |
| Nucleotide monophosphates mg | 29.5 | 29.5 | all as for 2A |
| Calcium mg | 750 | 1000 | |
| Phosphorus mg | 400 | 600 | |
| Magnesium mg | 70 | 81 | |
| Iron mg | 3 | 2.4 | |
| Zinc mg | 8 | 10.5 | |
| Manganese mcg | 200 | 105 | |
| Copper mcg | 700 | 1417.5 | |
| Iodine mcg | 83 | 81 | |
| Sodium mg | 320 | 405 | |
| Potassium mg | 750 | 972 | |
| Chloride mg | 530 | 729 | |

What is claimed is:

1. A nutritionally complete food product adapted for human infant nutrition, comprising a protein source, a carbohydrate source, vitamins, minerals, and a corandomized, all vegetable oil fat composition, wherein the fat composition comprises
   (a) 20–29%, calculated on the weight of the fat composition, of one or more lauric acid oils selected from coconut oil, babassu oil, and palm kernel oil;
   (b) 26–38%, calculated on the weight of the fat composition, of one or two palmitic acid oils selected from palm oil and palm olein oil;
   (c) 14–30%, calculated on the weight of the fat composition, of one or more oleic acid oils selected from olive oil, safflower oleic oil, sunflower oleic oil, and canola oil; and
   (d) 14–27%, calculated on the weight of the fat composition, of one or more linoleic acid oils selected from corn oil, cottonseed oil, safflower oil, soybean oil, and sunflower oil,
wherein at least the palmitic acid oils and the lauric acid oils are corandomized, and wherein the amounts of the oils being such that the fat composition contains, per 100 parts by weight of the total fatty acids present as triglycercides,
   (i) 10–17 parts of lauric acid;
   (ii) 11–22 parts of palmitic acid;
   (iii) 3–8 parts of stearic acid;
   (iv) 30–43 parts of oleic acid; and
   (v) 13–23 parts of linoleic acid.

2. A nutritionally complete food product adapted for human infant nutrition according to claim 1 wherein only the palmitic acid oils and the lauric acid oils are corandomized.

3. A nutritionally complete food product adapted for human infant nutrition according to claim 2 wherein only one palmitic acid oil and one lauric acid oil are corandomized.

4. A nutritionally complete food product adapted for human infant nutrition according to claim 3 wherein the palmitic acid oil is palm olein oil and the lauric acid oil is coconut oil.

5. A nutritionally complete food product adapted for human infant nutrition according to claim 1 wherein only one of each type of oil is used.

6. A nutritionally complete food product adapted for human infant nutrition according to claim 1 wherein one palmitic acid oil is used, which is palm olein oil.

7. A nutritionally complete food product adapted for human infant nutrition according to claim 1 wherein one oleic acid oil is used, which is either sunflower oleic oil or safflower oleic oil.

8. A nutritionally complete food product adapted for human infant nutrition according to claim 1 wherein only one linoleic acid oil is used, which is soybean oil.

9. A nutritionally complete food product adapted for human infant nutrition according to claim 1 wherein the oils comprise
   (a) 22–28% coconut oil;
   (b) 30–36% palm olein oil;
   (c) 21–30% safflower oleic oil or sunflower oleic oil; and
   (d) 14–22% soybean oil,
wherein the coconut oil and palm olein oil are corandomized.

10. A nutritionally complete food product adapted for human infant nutrition according to claim 9 wherein the fat composition contains, per 100 parts by weight of total fatty acid present as triglycerides,
   (i) 8–14 parts of lauric acid;
   (ii) 15–21 parts of palmitic acid;
   (iii) 3–5 parts of stearic acid;
   (iv) 35–43 parts of oleic acid; and
   (v) 14–21 parts of linoleic acid.

11. A nutritionally complete food product adapted for human infant nutrition according to claim 10 wherein the ratio of corandomized palm olein oil to coconut oil is between 56/44 palm olein oil/coconut oil and 44/56 palm olein oil/coconut oil.

12. A nutritionally complete food product adapted for preterm or low birthweight human infant nutrition, comprising a protein source, a carbohydrate source, vitamins, minerals, and a corandomized, all vegetable oil fat composition, wherein the fat composition comprises
   (a) 15–29%, calculated on the weight of the fat composition, of one or more lauric acid oils selected from coconut oil, babassu oil, and palm kernel oil;
   (b) 15–32%, calculated on the weight of the fat composition, of one or more palmitic oils selected front palm oil and palm olein oil;
   (c) 8–30%, calculated on the weight of the fat composition, of one or more oleic acid oils selected from olive oil, safflower oleic oil, sunflower oleic oil, and canola oil;
   (d) 14–27%, calculated on the weight of the fat composition, of one or more linoleic acid oils selected from corn oil, cottonseed oil, safflower oil, soybean oil, and sunflower oil; and (e) 10–30%, calculated on the weight of the fat composition, of medium-chain triglycerides, wherein at least the palmitic acid oils and the lauric acid oils are corandomized, and wherein the amounts of the oils being such that the fat composition contains, per 100 parts by weight of the total fatty acids present as triglycercides, (i) 8–25 parts of caprylic acid;
(ii) 4–12 parts of capric acid;
(iii) 7–20 parts of palmitic acid;
(iv) 25–37 parts of oleic acid; and
(v) 12–20 parts of linoleic acid.

13. A nutritionally complete food product adapted for preterm or low birthweight human infant nutrition according to claim 12 wherein only the palmitic acid oils and the lauric acid oils are corandomized.

14. A nutritionally complete food product adapted for preterm or low birthweight human infant nutrition according to claim 12 wherein only one palmitic acid oil and one lauric acid oil are corandomized.

15. A nutritionally complete food product adapted for preterm or low birthweight human infant nutrition according to claim 13 wherein the palmitic acid oil is palm olein oil and the lauric acid oil is coconut oil.

16. A nutritionally complete food product adapted for preterm or low birthweight human infant nutrition according to claim 12 wherein the palmitic acid oil is palm olein oil.

17. A nutritionally complete food product adapted for preterm or low birthweight human infant nutrition according to claim 12 wherein only one of each type of oil is used.

18. A nutritionally complete food product adapted for preterm or low birthweight human infant nutrition according to claim 12 wherein one oleic acid oil is used, which is either sunflower oleic oil or safflower oleic oil.

19. A nutritionally complete food product adapted for preterm or low birthweight human infant nutrition according to claim 12 wherein only one linoleic acid oil is used, which is soybean oil.

20. A nutritionally complete food product adapted for preterm or low birthweight human infant nutrition according to claim 12 wherein the oils comprise (a) 22–28% coconut oil;
(b) 20–30% palm olein oil;
(c) 19–30% safflower oleic oil or sunflower oleic oil;
(d) 14–22% soybean oil; and
(e) 10–30% medium-chain triglycerides, wherein the coconut oil and palm olein oil are corandomized, and wherein the fat composition contains, per 100 parts by weight of total fatty acid present as triglycerides, (i) 8–20 parts of caprylic acid;
(ii) 4–8 parts of capric acid;
(iii) 10–17 parts of palmitic acid;
(iv) 26–36 parts of oleic acid; and
(v) 12–20 parts of linoleic acid.

21. A nutritionally complete food product adapted for preterm or low birthweight human infant nutrition according to claim 20 wherein the ratio of corandomized palns olein oil to coconut oil is between 56/44 palm olein oil/coconut oil and 44/56 palm olein oil/coconut oil.

22. A nutritionally complete food product adapted for human infant nutrition, comprising a protein source, a carbohydrate source, vitamins, minerals, and a corandomized, all vegetable oil fat composition, wherein the fat composition comprises (a) 16–32%, calculated on the weight of the fat composition, of one or more lauric acid oils selected from coconut oil, babassu oil, and palm kernel oil;

(b) 20–49%, calculated on the weight of the fat composition, of one or more palmitic acid oils selected from palm oil, and palm olein oil;

(c) 13–37%, calculated on the weight of the fat composition, of one or more oleic acid oils selected from olive oil, safflower oleic oil, sunflower oleic oil, and canola oil; and (d) 0–32%, calculated on the weight of the fat composition, of one or more linoleic acid oils selected from corn oil, cottonseed oil, safflower oil, soybean oil, and sunflower oil, wherein the palmitic acid oil or oils and the oleic acid oil or oils, or the palmitic acid oil or oils, the oleic acid oil or oils and the linoleic acid oil or oils, are corandomized, the amounts of the oils being such that the fat composition contains, per 100 parts by weight of the total fatty acids present as triglycerides, (i) 9–22 parts of lauric acid;
(ii) 13–22 parts of palmitic acid;
(iii) 28–43 parts of oleic acid;
(iv) 10–23 parts of linoleic acid; and
(v) 1.4–3.7 parts of α-linolenic acid.

23. A nutritionally complete food product adapted for human infant nutrition according to claim 22 wherein only the palmitic acid oils and the oleic acid oils are corandomized.

24. A nutritionally complete food product adapted for human infant nutrition according to claim 22 wherein only one palmitic acid oil and one oleic acid oil are corandomized.

25. A nutritionally complete food product adapted for human infant nutrition according to claim 24 wherein the palmitic acid oil is palm olein oil and the oleic acid oil is canola oil.

26. A nutritionally complete food product adapted for human infant nutrition according to claim 22 wherein only one of each type of oil is used.

27. A nutritionally complete food product adapted for human infant nutrition according to claim 22 wherein one palmitic acid oil is used, which is palm olein oil.

28. A nutritionally complete food product adapted for human infant nutrition according to claim 22 wherein one oleic acid oil is used, which is canola oil.

29. A nutritionally complete food product adapted for human infant nutrition according to claim 22 wherein only one linoleic acid oil is used, which is corn oil or soybean oil.

30. A nutritionally complete food product adapted for human infant nutrition according to claim 22 wherein the linoleic acid to α-linolenic acid ratio is between 11 to 1 and 4 to 1.

31. A nutritionally complete food product adapted for human infant nutrition, comprising a protein source, a carbohydrate source, vitamins, minerals, and a corandomized, all vegetable oil fat composition, wherein the fat composition comprises (a) 16–27%, calculated on the weight of the fat composition, of a lauric acid oil selected from coconut oil, babassu oil, and palm kernel oil;

(b) 30–46%, calculated on the weight of the fat composition, of a palmitic acid oil selected from palm oil and palm olein oil;

(c) 13–34%, calculated on the weight of the fat composition, of an oleic acid oil selected from olive oil, safflower oleic oil, sunflower oleic oil, and canola oil; and (d) 7–26%, calculated on the weight of the fat composition, of a linoleic acid oil selected from corn oil, cottonseed oil, safflower oil, soybean oil, and sunflower oil, wherein the palmitic acid oil and the oleic acid oil are corandomized, the amounts of the oils being such that the fat composition contains, per 100 parts by weight of the total fatty acids present as triglycercides, (i) 9–15 parts of lauric acid;

(ii) 16–22 parts of palmitic acid;

(iii) 32–42 parts of oleic acid;

(iv) 10–20 parts of linoleic acid; and (v) 2.4–3.7 parts of α-linolenic acid.

32. A nutritionally complete food product adapted for human infant nutrition according to claim 31 wherein the palmitic acid oil is palm olein oil and the oleic acid oil is canola oil.

33. A nutritionally complete food product adapted for human infant nutrition according to claim 31 wherein one palmitic acid oil is used, which is palm olein oil.

34. A nutritionally complete food product adapted for human infant nutrition according to claim 31 wherein one oleic acid oil is used, which is canola oil.

35. A nutritionally complete food product adapted for human infant nutrition according to claim 31 wherein only the linoleic acid oil used is corn oil or soybean oil.

36. A nutritionally complete food product adapted for human infant nutrition according to claim 31 wherein the linoleic acid to α-linolenic acid ratio is between 9 to 1 and 4 to 1.

37. A nutritionally complete food product adapted for human infant nutrition according to claim 31 wherein the fat composition comprises (a) 20–25% coconut oil;

(b) 39–46% palm oil or palm olein oil;

(c) 14–29% canola oil;and (d) 11–20% corn oil or soybean oil, wherein the palm olein oil and the canola oil are corandomized, and wherein the fit composition contains, per 100 parts by weight of total fatty acid present as triglycerides, (i) 9–14 parts of lauric acid;

(ii) 18–22 parts of palmitic acid;

(iii) 33–39 parts of oleic acid;

(iv) 15–19 parts of linoleic acid; and (v) 2.4–3.7 parts of α-linolenic acid.

38. A nutritionally complete food product adapted for preterm or low birthweight human infant nutrition, comprising a protein source, a carbohydrate source, vitamins, minerals, and a corandomized, all vegetable oil fat composition, wherein the fat composition comprises (a) 8–27%, calculated on the weight of the fat composition, of one or more lauric acid oils selected from coconut oil, babassu oil, and palm kernel oil;

(b) 10–49%, calculated on the weight of the fat composition, of one or more palmitic oils selected from palm oil or palm olein oil;

(c) 8–45%, calculated on the weight of the fat composition, of one or more oleic acid oils selected from olive oil, safflower oleic oil, sunflower oleic oil, and canola oil;

(d) 0–22%, calculated on the weight of the fat composition, of one or more linoleic acid oils selected from corn oil, cottonseed oil, safflower oil, soybean oil, and sunflower oil; and (e) 10–50%, calculated on the weight of the fat composition, of medium-chain triglycerides, wherein the palmitic acid oil or oils and the oleic acid oil or oils, or the palmitic acid oil or oils, the oleic acid oil or oils and the linoleic acid oil or oils, are corandomized, the amounts of the oils being such that the fat composition contains, per 100 parts by weight of the total fatty acids present as triglycerides, (i) 8–34 parts of caprylic acid;

(ii) 4–16 parts of capric acid;

(iii) 5–19 parts of palmitic acid;

(iv) 16–39 parts of oleic acid;

(v) 9–20 parts of linoleic acid; and (vii) 1.4–3.7 parts of α-linolenic acid.

39. A nutritionally complete food product adapted for preterm or low birthweight human infant nutrition according to claim 38 wherein only the palmitic acid oils and the oleic acid oils are corandomized.

40. A nutritionally complete food product adapted for preterm or low birthweight human infant nutrition according to claim 38 wherein only one palmitic acid oil and one oleic acid oil are corandomized.

41. A nutritionally complete food product adapted for preterm or low birthweight human infant nutrition according to claim 39 wherein the palmitic acid oil is palm olein oil and the oleic acid oil is canola oil.

42. A nutritionally complete food product adapted for preterm or low birthweight human infant nutrition according to claim 38 wherein the palmitic acid oil is palm olein oil.

43. A nutritionally complete food product adapted for preterm or low birthweight human infant nutrition according to claim 38 wherein only one of each type of oil is used.

44. A nutritionally complete food product adapted for preterm or low birthweight human infant nutrition according to claim 38 wherein one oleic acid oil is used, which is canola oil.

45. A nutritionally complete food product adapted for preterm or low birthweight human infant nutrition according to claim 38 wherein only one linoleic acid oil is used, which is corn oil or soybean oil.

46. A nutritionally complete food product adapted for preterm or low birthweight human infant nutrition according to claim 38 wherein the linoleic acid to α-linolenic acid ratio is between 11 to 1 and 4 to 1.

47. A nutritionally complete food product adapted for preterm or low birthweight human infant nutrition, comprising a protein source, a carbohydrate source, vitamins, minerals, and a corandomized, all vegetable oil fat composition, wherein the fat composition comprises (a) 9–27%, calculated on the weight of the fat composition, of a lauric acid oil selected from coconut oil, babassu oil, and palm kernel oil;

(b) 15–40%, calculated on the weight of the fat composition, of a palmitic oil selected from palm oil, or palm olein oil;

(c) 12–33%, calculated on the weight of the fat composition, of an oleic acid oil selected from olive oil, safflower oleic oil, sunflower oleic oil, and canola oil;

(d) 8–22%, calculated on the weight of the fat composition, of a linoleic acid oil selected from corn oil, cottonseed oil, safflower oil, soybean oil, and sunflower oil; and (e) 10–30%, calculated on the weight of the fat composition, of medium-chain triglycerides, wherein the palmitic acid oil and the oleic acid oil are corandomized, the amounts of the oils being such that the fat composition contains, per 100 parts by weight of the total fatty acids present as triglycercides, (i) 8–22 parts or caprylic acid;

(ii) 4–10 parts of capric acid;

(iii) 9–19 parts of palmitic acid;

(iv) 23–36 parts of oleic acid;

(v) 13–19 parts of linoleic acid; and (vii) 2.3–3.4 parts of α-linolenic acid.

48. A nutritionally complete food product adapted for preterm or low birthweight human infant nutrition according to claim 47 wherein the palmitic acid oil is palm olein oil and the oleic acid oil is canola oil.

49. A nutritionally complete food product adapted for preterm or low birthweight human infant nutrition according to claim 47 wherein one oleic acid oil is used, which is canola oil.

50. A nutritionally complete food product adapted for preterm or low birthweight human infant nutrition according to claim 47 wherein only one linoleic acid oil is used, which is corn oil or soybean oil.

51. A nutritionally complete food product adapted for preterm or low birthweight human infant nutrition according to claim 47 wherein the linoleic acid to α-linolenic acid ratio is between 9 to 1 and 4 to 1.

52. A nutritionally complete food product adapted for preterm or low birthweight human infant nutrition according to claim 47 wherein the oils comprise (a) 9–27% coconut oil;

(b) 16–32% palm oil or palm olein oil;

(c) 16–33% canola oil;

(d) 9–20% corn oil or soybean oil; and (e) 10–30% medium chain triglycerides, wherein the palm olein oil and the canola oil are corandomized, and wherein the fat composition contains, per 100 parts by weight of total fatty acid present as triglycerides, (i) 8–21 parts of caprylic acid;

(ii) 4–10 parts of capric acid;

(iii) 10–17 parts of palmitic acid;

(iv) 27–33 parts of oleic acid;

(v) 14–18 parts of linoleic acid; and (vii) 2.3–3.4 parts of α-linolenic acid.

\* \* \* \* \*